Dec. 24, 1940.   C. P. SWEENY   2,225,935
MOTOR SYSTEM
Filed July 11, 1939
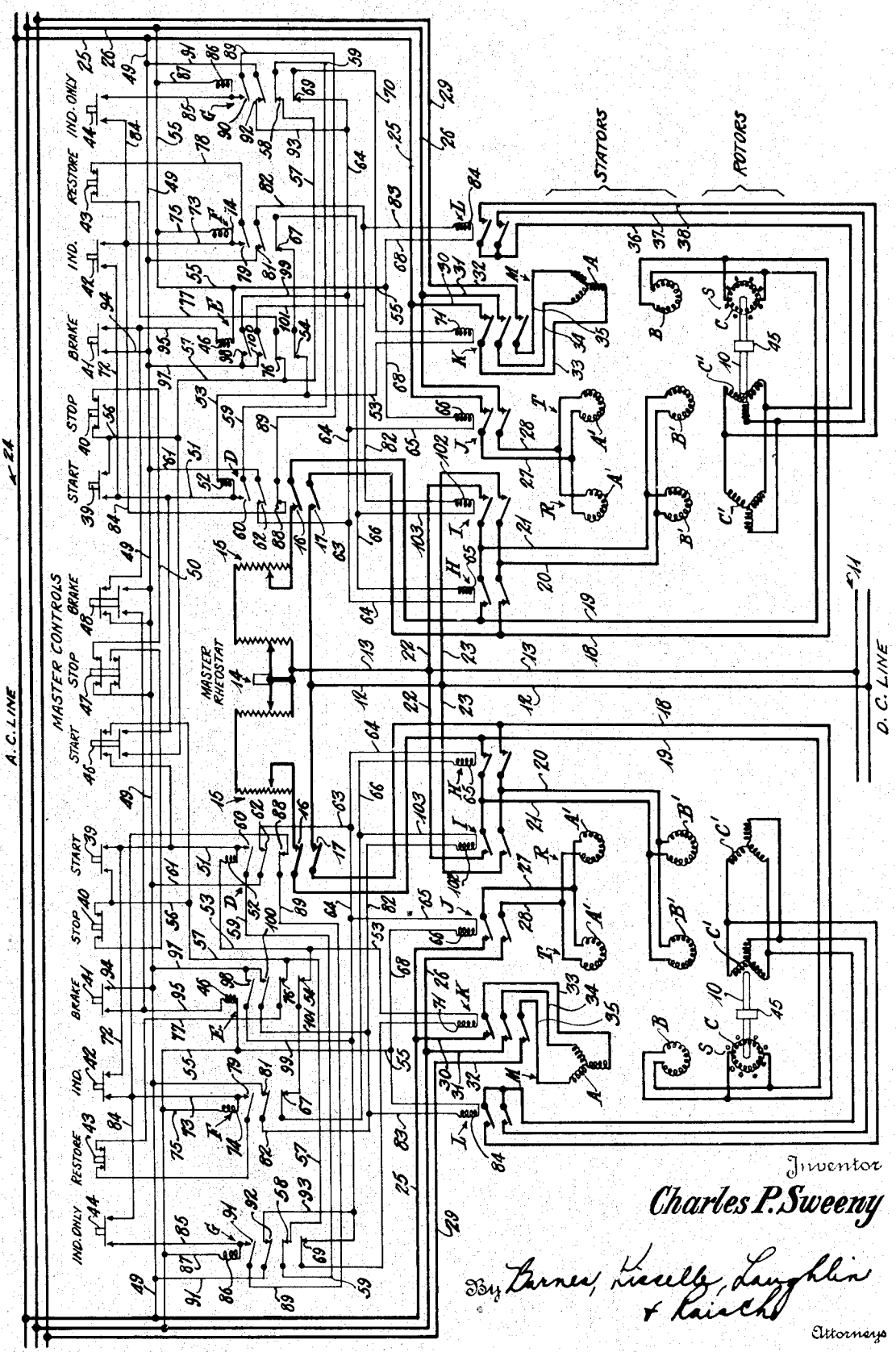
Inventor
Charles P. Sweeny
By Barnes, Kisselle, Laughlin & Raisch
Attorneys Patented Dec. 24, 1940

2,225,935

UNITED STATES PATENT OFFICE 2,225,935

MOTOR SYSTEM

Charles P. Sweeny, Detroit, Mich., assignor to Vickers, Incorporated, Detroit, Mich., a corporation of Michigan Application July 11, 1939, Serial No. 283,898

13 Claims. (Cl. 172—293)

This invention relates to mill drives, and more particularly to a motor system in which a plurality of sets of alternating current motors are independently or simultaneously controlled both as to starting and stopping and for varying the speed of the motors of the respective sets.

In driving various types of machinery, particularly machinery carrying on continuous operations, for example, continuous steel mills, paper mills, printing presses, etc., it is necessary to drive the various units of the apparatus at speeds which are variable with respect to each other. In many cases, a plurality of motors driving various elements, such as the rolls, of a unit, can be driven by a set of motors operating at the same speed. However, the speed of the various units should be variable to take care of changes in the process and all of the motors of the entire apparatus should be capable of having their speed simultaneously increased or decreased proportionally. The various units of the apparatus should be capable of being started and rapidly stopped, either independently or simultaneously. In many cases, one or more of the units may have a normal speed at which they can be driven by motors of the constant speed type and the present invention contemplates motors which can be converted into constant speed motors during operation. Heretofore, direct current motors have almost universally been employed for driving apparatus of the type described in order to obtain adequate speed control.

It is an object of the present invention to provide an improved mill drive employing variable speed alternating current motors.

Another object of the invention is to provide a mill drive in which the speeds of all the motors are simultaneously adjustable and the speed of the motors of any set of motors is independently adjustable.

It is another object of the invention to provide an improved mill drive employing power motors of the self-synchronous type.

Another object of the invention is to provide an improved mill drive employing sets of power motors of the self-synchronous type to drive the various units of the mill in which such motors of any set may be converted into induction motors provided with synchronizing connections to maintain the various motors of the set at the same speed.

Another object of the invention is to provide an improved braking arrangement in which the motors themselves function as brakes for the machinery being driven.

A still further object of the invention is to provide an improved mill drive in which motors may be employed as brakes to stop the machinery being driven.

Other objects and advantages of the invention will appear in the following description of a preferred embodiment thereof shown in the attached drawing, which is a schematic diagram of the motor system of the present invention.

Referring to the drawing, two sets of motors are diagrammatically shown, each set comprising a main driving motor M, a transmitting motor T and at least one mill driving or receiving motor R. It is understood that there may be more than two sets of motors and that each set may include two or more mill driving or receiving motors. The main motors M are alternating current variable speed polyphase induction motors of the type disclosed in my copending application serial No. 72,632, filed April 3, 1936. Each main driving motor M includes a primary winding A upon one of the motor members, a direct current control winding B upon the same member as the primary winding and a secondary winding C upon the other member of the motor. Preferably the windings A and B are upon the motor stator, while the winding C is upon the rotor. The winding C is connected in parallel with the winding B so that the winding B forms a load for currents produced by induction motor action in the winding C. An additional secondary winding of the squirrel cage type as indicated at S may be also positioned upon the same member as the winding C. The winding C may also function as an additional control winding and, as clearly disclosed in the applications above referred to, the motors M are variable speed induction motors in which the speed is varied over a wide range by variation of the direct current energization of the windings B and C. Increasing the direct current energization of the windings B and C decreases the speed of the motor, and conversely, decreasing the energization of these windings increases the speed of the motor. These motors have characteristics approaching those of direct current shunt motors.

The transmitting motors T and receiving motors R are of the type disclosed in my application Serial No. 116,430, filed December 17, 1930, now Patent No. 2,151,058, granted March 21, 1939, and each includes a single phase alternating current primary winding A', a direct current winding B' upon the same member as the primary winding and a phase wound secondary winding C' upon the other member of the motor. Preferably, the windings A' and B' are upon the stator member and the windings C' are upon the rotor members. The transmitting motor T and the receiving motor R may be identical in construction, but if more than one receiving motor R is employed with a single transmitting motor T, the transmitting motor should be of sufficient size to furnish power to all of the receiving motors connected thereto. The rotor of the main motors M of each set are mechanically connected to the rotor of the transmitting motors T of the same set, for example, through a shaft 10, so that the primary motors drive their respective transmitting motors. The receiving motors R of each set are electrically connected to the transmitting motor T of the same set so that under ordinary conditions of operation the receiving motors operate synchronously with their respective transmitting motors. The receiving motors R are employed to furnish mechanical power to apparatus to be driven. The transmitting motors T may also be employed to furnish mechanical power if they are of sufficient size to furnish both mechanical power to apparatus to be driven and electrical power to the receiving motors. It will be noted that the windings A' and C' of the transmitting motors T and receiving motors R are similar to the windings of conventional self-synchronous motors. The energization of the additional winding B' of these motors, however, increases the torque of the motors both at low speeds and at high speeds, as explained in Patent No. 2,151,058 referred to above. These motors may also be connected to operate as single phase induction motors with the windings B' functioning as synchronizing windings as hereinafter explained.

The control system for each set of motors may be identical with the control system of the other sets of motors, and only one system will be specifically described.

Each control system includes a plurality of control relays D, E, F and G and a plurality of contactors H, I, J, K and L. The control relay D also functions as a contactor to connect the windings B and C of motor M to the direct current line 11 through conductors 12 and 13, master control rheostat 14, individual control rheostat 15, normally open contacts 16 and 17 of relay D, and conductors 18 and 19. The contactor H connects the windings B' of motors R and T in parallel with the windings B and C of motor M by connecting the conductors 18 and 19 to the conductors 20 and 21. Contactor I, when closed, connects the windings B' of motors R and T directly to the direct current line 11 through conductors 12 and 13, conductors 22 and 23 and conductors 20 and 21. When both contactors H and I are closed, both the windings B' of motors R and T and the windings B and C of motor M are also connected directly to the direct current line 11, as the contactor H connects the windings B' of motors R and T in parallel with the windings B and C of motor M. Closing of contactor J connects the windings A' of motors R and T to the three phase alternating current line 24 through conductors 25 and 26 and conductors 27 and 28. This provides for single phase energization of the windings A'. Contactor K, when closed, connects the windings A of motor M to the alternating current line through conductors 25, 26 and 29, conductors 30, 31 and 32, and conductors 33, 34 and 35. Contactor L, when closed, short circuits windings C' of motors R and T through conductors 36, 37 and 38.

Each control system is also provided with a start button 39, depression of which starts all of the motors and brings the system into normal running condition, as hereinafter described more in detail. A stop button 40 is also provided for each control system, depression of which disconnects all of the motors from both the direct current and alternating current lines to bring the system into idle conditon and to allow the motors to coast to a stop. A brake button 41 is also provided, depression of which brings the system to braking condition and causes all of the motors to act as brakes to quickly stop the same. Release of the brake button leaves the system in idle condition so that the motors remain stopped or coast to a stop if the brake button is released prior to complete stopping. A button 42 marked "Ind." is provided, depression of which brings the system to "Induction" condition and converts the motors R and T from self-synchronous motors into single phase induction motors. A button 43 marked "Restore" is provided, depression of which brings the system back to normal running condition from induction condition and restores the motors R and T to their self-synchronous connection. A button 44 marked "Ind. Only" is also provided, depression of which disconnects the motor M from both the alternating current and direct current line if the motors R and T are already operating as induction motors to bring the system to "induction only" condition. Depression of "Restore" button 43 after "Induction Only" button 44 has been depressed will merely disconnect motors R and T from the alternating current and direct current lines to bring the system to idle condition and allow all of the motors to come to a stop. However, depression of start button 39 after button 44 has been depressed will again cause motor M to be started to bring the system to "Induction" condition, and then the "Restore" button is effective to convert the motors R and T back into self-synchronous motors to bring the system back to normal running condition. Depression of the brake button 41 at any time when any of the motors are operating or coasting immediately brings the system to braking condition and causes all of the motors to act as brakes no matter what the condition of the circuit prior to the depression thereof. The braking condition of the system is maintained only during depression of the brakes button but the other buttons may be released immediately after depression without further changing the condition of the system.

As a guide to understanding the detailed description of the operation of the relays and contactors hereinafter given, the following general summary of the position of the relays and contactors is given.

All of the relays and contactors are in the positions shown when the system is in idle condition, and these positions of the relays and contactors will be referred to as the "open" positions.

In normal running position, contactors D, H, J and K are in closed position, while relays E, F, G and contactors I and L are in open position.

Under these conditions, three phase alternating current is applied to the winding A of motor M and direct current is applied to the windings B and C of this motor through the rheostats 14 and 15. Single phase alternating current is applied to the windings A' of motors R and T and the windings B' of these motors are connected to the direct current line in parallel with the windings B and C of motor M. The motor M runs as a variable speed alternating current motor, the speed of which is controlled by the rheostats 14 and 15, to drive motor T through the shaft 10. Motor R functions as a self-synchronous receiver running in synchronism with the motor T which functions as a self-synchronous transmitter. The interconnection of the windings B' of the motors R and T through the conductors 20 and 21 furnishes a path for alternating currents which provide a synchronizing torque between these motors both when the motors are operating as self-synchronous motors and when they are operating as single phase induction motors. Application of direct current energization to these windings when the motors are operating as self-synchronous motors further increases the synchronizing torque between the motors. As the necessary synchronizing torque is usually greatest at low speeds, the windings B' of motors R and T are connected in parallel with the windings B and C of motor M under normal running condition so that the direct current energization of windings B' of motors R and T is increased at low speeds.

When the system is in "Induction" condition, contactors D, J, K and L and relay F are closed, and relays E, G and contactors H and I are open.

In this condition, three phase alternating current is applied to the winding A of motor M and direct current is applied to the windings B and C of this motor through the rheostats 14 and 15. Also, single phase alternating current is applied to the windings A' of the motors R and T, the windings B' of these motors are disconnected from the direct current line but are connected together, and the windings C' are short circuited by the contactor L. The motor M runs as a three phase variable speed alternating current motor and the motors R and T run as single phase induction motors.

When the system is in "Induction Only" condition, relays F and G and contactors J and L are closed, while contactors D, H, I and K, as well as relay E, are open.

Under these conditions, motors R and T run as single phase induction motors, while motor M is deenergized and may run either driven by the motor T or a magnetic or other form of clutch indicated at 45 may be employed to disconnect the motor T from the motor M whenever relay G is closed.

When the system is in braking condition, relay E and contactors H, I, J and L are closed, while relays F and G and contactors D and K are open. Under these conditions, the windings B and C of motor M and the windings B' of motors R and T are connected directly to the direct current line and the windings A' of motors R and T are connected to the alternating current line. Also, the windings C' of the motors R and T are short circuited while the winding A of motor M is deenergized. This causes all of the motors to act as brakes to come quickly to a stop.

If desired, master control buttons, including a start button 46, a stop button 47 and a brake button 48 may be provided. Master start button 46 is connected in parallel with the start buttons 39, the master stop button 47 has contacts connected in series with the stop buttons 40, and the master brake button 48 has contacts connected in parallel with the brake buttons 41. Depression of the master control buttons 46, 47 or 48 controls both sets of motors, while depression of individual control buttons 39, 40 or 41 controls only the set of motors associated therewith. The master control rheostat 14 varies the voltage applied to the windings B and C of the motors M of both sets of motors, while individual control rheostats 15 vary the voltage applied to the winding B of a motor M of only the associated set of motors.

As before stated, depression of the start button 39 closes relay or contactor O. This circuit may be traced from alternating current conductor 25, connected to one wire of the alternating current line 24, through conductor 49, upper normally closed contacts of master stop button 47, conductor 50, normally closed contacts of stop button 40, closed normally open contracts of start button 39, conductor 51, operating coil 52 of relay or contactor D, conductor 53, normally closed contacts 54 of relay E, and conductor 55 to conductor 26, connected to another wire of the alternating current line 24. Energization of operating coil 52 causes contactor D to close and lock this contactor in closed position. The locking circuit can be traced from conductor 25 through conductor 49, upper normally closed contacts of master stop button 47, conductor 50, normally closed contacts of stop button 40, conductor 56, conductor 57, normally closed contacts 58 of relay G, conductor 59, closed normally open contacts 60 of relay D, conductor 53, normally closed contacts 54 of relay E and conductor 55 to conductor 26.

Closing of contactor D also causes closing of contactor H. This circuit may be traced from conductor 25 through conductor 49, conductor 61, closed normally open contacts 62 of relay D, conductor 63, conductor 64, operating coil 65 of contactor H, conductor 66, normally closed contact 67 of relay F and conductor 55 to conductor 26.

Closing of contactor D also closes contactor J. This circuit may be traced from conductor 25 through conductor 49, conductor 61, closed normally open contact 62 of relay D, conductor 63, conductor 64, conductor 65, operating coil 66 of contactor J, conductor 68 and conductor 55 to conductor 26.

Closing of contactor D also closes contactor K. This circuit may be traced from conductor 25 through conductor 49, conductor 61, closed normally open contact 62 of relay D, conductor 63, conductor 64, normally closed contacts 69 of relay G, conductor 70, operating coil 71 of contactor K, conductor 63, normally closed contacts 54 of relay E, and conductor 55 to conductor 26.

The other relays and contactors remain open. That is to say, contactors D and H are closed to apply direct current to the windings B and C of motor M and windings B' of motors R and T through the rheostats 14 and 15. Contactor J is closed to apply single phase alternating current to the windings A' of motors R and T and contactor K is closed to apply three phase alternating current to the winding A of motor M. As stated before, this is the normal running condition of the system.

As the contacts of the stop button 40 were included in the locking circuit for relay or contactor D as above traced, depression of the stop button 40 breaks the circuit through the operating coil 52 of the contactor or relay D to allow this contactor or relay to open. This breaks the circuits through the operating coils of contactors H, J and K as all of the circuits for the operating coils 65, 66 and 71 of these contactors, respectively, included the normally open contact 62 of relay D. Thus, depression of the stop button deenergizes all of the motors and allows them to coast to a stop and leaves the system in idle condition.

When the system is in normal running condition and the motors are running as above described, depression of induction button 42 removes the direct current energization from the windings B' of motors R and T and short circuits the windings C' of these motors. It will be remembered that under normal running conditions contactor or relay D is closed as well as contactors H, J and K. Depression of the button 42 first causes relay F to be closed. This circuit may be traced from conductor 25 through conductor 49, normally closed upper contacts of master stop button 47, conductor 50, normally closed contacts of stop button 40, conductor 56, conductor 59, closed normally open contacts 60 of contactor or relay D, conductor 51, conductor 72, closed normally open contacts of induction button 42, conductor 73, operating coil 74 of relay F, conductor 75 and conductor 55 to conductor 26.

Closing of relay F causes this relay to lock itself in closed position. This circuit may be traced from conductor 25 through conductor 49, normally closed upper contacts of master stop button 47, conductor 50, normally closed contacts of stop button 40, conductor 56, conductor 57, normally closed contacts 76 of relay E, conductor 77, normally closed contacts of "Restore" button 43, conductor 78, closed normally open contacts 79 of relay F, operating coil 74 of relay F, conductor 75 and conductor 55 to conductor 26.

Closing of relay F causes opening of contactor H by opening normally closed contacts 67 thereof. It will be remembered that the circuit for energizing operating coil 65 of contactor H included normally closed contacts 67 of relay F. Closing of relay F also causes closing of contactor L. This circuit may be traced from conductor 25 through conductor 49, conductor 80, closed normally open contacts 81 of relay F, conductor 82, conductor 83, operating coil 84 of contactor L, conductor 68 and conductor 55 to conductor 26. Thus, depression of induction button 42 when contactor B is closed charges the system to "Induction," a condition in which contactors D, J, K and L and relay F are closed and contactors H, I and relays E and G are open. Under these conditions, single phase alternating current is applied to the windings A' of motors R and T, the windings C' of these motors are short circuited and the windings B' are disconnected from the direct current line so that the motors run as single phase induction motors with a synchronizing connection between the windings B' of the motors. At the same time, winding A of motor M is energized with three phase alternating current power through the contactor K, and the windings B and C of this motor are connected to the direct current line by contactor D through the rheostats 14 and 15. The motor A, therefore, is still running as a variable speed polyphase induction motor.

If, under these conditions, the "Restore" button 43 is depressed, relay F is opened to restore the motors to the running position. It will be remembered that the locking circuit for the relay F as traced above included the normally closed contacts of "Restore" button 43, so that opening of these contacts allows relay F to open, thus causing contactor H to close and contact L to open, restoring the motors to the normal running position.

Under the normal running conditions of the motors, the "Induction Only" button 44 is ineffective, but when the "Induction" button 42 has been depressed to close and lock relay F, the "Induction Only" button 44 is effective when depressed to close relay G and thereby open contactor D and contactor K and bring the system to the "Induction Only" condition. The circuit closing relay G when the "Induction Only" button 44 is depressed, may be traced from conductor 25 through conductor 49, normally closed upper contacts of master stop button 47, conductor 50, normally closed contacts of stop button 40, conductor 56, conductor 57, normally closed contacts 76 of relay E, conductor 77, normally closed contacts of "Restore" button 43, conductor 78, closed normally open contacts 79 of relay F, conductor 73, conductor 84, closed normally open contacts of "Induction Only" button 44, conductor 85, operating coil 86 of relay G, conductor 87 and conductor 55 to conductor 26.

Closing of relay G opens contactor B, as the locking circuit for relay D as traced above included normally closed contacts 58 of relay G. This allows relay D to open to disconnect the windings B and C of the motor M from the direct current line. Opening of relay D also causes contactor K to open, as the operating circuit for operating coil 71 of contactor K included normally open contacts 62 of relay E.

Closing of relay G and opening of relay D completes a locking circuit through operating coil 86 of relay G to maintain this relay in closed position. This circuit may be traced from conductor 25, conductor 49, upper normally closed contact of master stop button 47, conductor 50, normally closed contacts of stop button 40, conductor 56, conductor 57, normally closed contacts 76 of relay E, conductor 77, normally closed contacts of "Restore" button 43, conductor 78, closed normally open contacts 79 of relay F, conductor 73, conductor 84, normally closed contacts 88 of relay D, conductor 89, closed normally open contacts 90 of relay G, operating coil 86 of relay G, conductor 87 and conductor 55 to conductor 26.

Opening of relay D also normally opens contactor J, as the energizing circuit for operating coil 66 of contactor J as above traced includes normally open contacts 62 of relay D. However, closing of relay G completes another circuit through contactor J to maintain this contactor closed. This circuit may be traced from conductor 25 through conductor 49, conductor 91, closed normally open contacts 92 of relay G, conductor 93, conductor 94, conductor 65, operating coil 67 of contactor J, conductor 68 and conductor 55 to conductor 26. Under these conditions, contactors D, H, K and K and relay E are open, while contactors J and L along with relays F and G are closed. This connects the windings A' of motors R and T to the alternating current line and short circuits the windings B' of motors R and T by the contactor L, while no energization is applied to the motor M. Thus, the motors R and T run as single phase induction motors with windings B' of these motors interconnected so as to hold these motors in step with each other. These motors would then drive motor M with its winding disconnected from the alternating current and direct current lines so as to require only enough power to overcome the friction of the motor M.

Under these conditions, depression of the "Restore" button deenergizes motors R and T, as these motors can not function as self-synchronous motors unless motor M is running. The locking circuits for both the relays F and G included the normally closed contacts of the "Restore" button 43. Thus, depression of this "Restore" button allows the relays F and G to open. The energization circuit for the operating coil 66 of contactor J included the normally open contacts 92 of relay G, so that opening of this relay causes the contactor J to open. Also, the energization circuit for the operating coil 84 of contactor L included the normally open contacts 81 of relay F, so that opening of the relay F allows the contactor L to open. This removes energization from all motors and brings the system to idle condition.

However, depression of the start button, when the system is in "Induction only" condition and motors R and T are operating alone as induction motors, causes energization to be reapplied to motor M. The circuit for closing the contactor D by depression of the start button is the same as that first traced. However, the locking circuit for relay G included the normally closed contacts 88 of relay D, so that closing of relay D opens the locking circuit of relay G and allows relay G to drop open. The locking circuit for relay D included the normally closed contacts 58 of relay G, so that opening of the relay G after relay D has closed completes the locking circuit through the operating coil 52 of relay D, and this relay is again locked in closed position. This again closes contactor K to energize the winding A of motor M and closes contactor H to energize the windings B and C of the motor M from the direct current line through the rheostats 14 and 15. This restores the circuit to the induction condition in which it was after the start button had originally been depressed and then the "Induction" button 42 depressed. The "Restore" button 43 is then effective to convert the motors R and T from induction motors back to self-synchronous motors, as above described, so that the motors are back in their normally running condition.

The stop button 40 is effective to disconnect all of the motors from both the alternating current and direct current lines under any condition of operation of the motors. That is to say, the normally closed contacts of the stop button 40 are included in all of the locking circuits for the contactor D and relays F and G. Depression of the stop button therefore breaks all of these locking circuits and allows any of them which are closed to return to open position. When the contactor D and relays F and G are open, it will be remembered that all of the contactors H, I, J, K and L are open so that the system is in idle condition.

However, the brake button 41 takes control of the system when depressed and brings the system to braking condition, irrespective of its former condition. That is to say, depression of the brake button opens contactor D if closed, and opens relays F and G if closed. This would normally cause opening of any of the contactors H, I, J, K or L which happened to be closed. However, the brake button is also effective to complete other circuits through contactors H, I, J and L to cause these contactors to close and bring the system to braking condition.

Depression of the brake button 41 first causes closing of relay E. This circuit can be traced from conductor 25 through conductor 49, conductor 94, closed normally open contacts of brake button 41, conductor 95, operating coil 96 of relay E, and conductor 55 to conductor 26. The locking circuit for the operating coil 52 of contactor D as traced above includes normally closed contacts 54 of relay E, so that closing of relay E opens the contacts 54 to allow contactor D to open, if previously closed. The locking circuit for operating coil 74 of relay F includes the normally closed contacts 76 of relay E so that closing of relay E opens contact 76 to allow relay F to open, if previously closed. The locking circuit for the operating coil 86 of relay G includes normally closed contacts 76 of relay E so that closing of relay E also allows relay G to open if this relay was in closed position.

Contactors H, I, J, K and L would thereupon return to open position, if closed, except that relay E completes circuits through the operating coils of contactors H, I, J and L to close them, if open, or retain them in closed position, if closed. This circuit through operating coil 65 of relay H may be traced from conductor 25 through conductor 49, conductor 97, closed normally open contacts 98 of relay E, conductor 99, conductor 64, operating coil 65 of contactor H, conductor 66, normally closed contacts 67 of relay F and conductor 55 to conductor 26. The circuit through the operating coil of contactor I may be traced from conductor 25 through conductor 49, conductor 97, closed normally open contacts 100 of relay E, conductor 101, conductor 82, operating coil 102 of contactor I, conductor 103, conductor 66, normally closed contacts 67 of relay F and conductor 55 to conductor 26. The circuit through operating coil of contactor J can be traced from conductor 25 through conductor 49, conductor 97, closed normally open contacts 98 of relay E, conductor 99, conductor 64, conductor 65, operating coil 66 of contactor J, conductor 68, and conductor 55 to conductor 26. The circuit through operating coil 84 of contactor L can be traced from conductor 25 through conductor 49, conductor 97, closed normally open contacts 100 of relay E, conductor 101, conductor 82, conductor 83, operating coil 84 of contactor L, conductor 68 and conductor 55 to conductor 26. This places the system in braking condition. The windings B' of motors R and T and the windings B and C of the motor M are connected directly to the direct current line through contactors H and I; the windings B' of motors R and T are connected directly to the direct current line through contactor I; the windings A' of motors R and T are connected to the alternating current line through contactor J; and the windings C' of motors R and T are short circuited by the contactor L.

As stated above, the master start button 46 has its upper contacts connected in parallel with one individual start button 39 and its lower contacts in parallel with another individual start button 39. Thus, the depression of master start button 46 is equivalent to depressing both individual start buttons 39. Master stop button 47 has its upper contacts in series with one individual stop button 40 and is lower contacts in series with another individual stop button 40. Depression of master stop button 47 is, therefore, equivalent to depressing both individual stop buttons 40. Furthermore, master brake button 48 has its upper contacts in parallel with one individual brake button 41 and its lower contacts in parallel with another individual brake button 41, so that depression of master brake button 48 is equivalent to depressing both brake buttons 41.

As further stated above, the motors M are variable speed alternating current induction motors having direct current energization for controlling the speed thereof; that is, increasing the direct current energization of the windings B and C of the motor M decreases the speed of the motor, and decreasing the energization increases the speed. The speed of both motors M can be varied by adjusting the master rheostat 14, while the speed of an individual motor M can be adjusted by adjusting the individual control rheostat 15 associated therewith.

In operation, the entire system, including both sets of motors, may be brought to normal running condition by depressing the master start button 46, the motors M, operating as variable speed induction motors, to drive the motors T mechanically through the shafts 10. The motors T in turn electrically drive the motors R associated therewith. The speed of either motor M may be varied by adjusting its associated individual rheostat 15. The speed of all the motors may be increased or decreased proportionately by adjusting the master control rheostat 14. All the motors M, T and R of a set of motors may be mechanically connected to individual shafts of a unit of a mill or other device so as to drive the shafts of the unit at proportional speeds. If the motor M is connected to a shaft to furnish mechanical power, it must be also of sufficient size to drive the motors T mechanically as well as the motors R electrically connected to the motors T. Also, the motors T must be of sufficient size to furnish mechanical power and drive the motor R electrically connected thereto. However, the motor M may have no mechanical connection to the unit but all of the driving may be performed by the motors T and R, in which case the motor T must be of sufficient size to furnish both mechanical and electrical power. The preferred arrangement is, however, to employ a plurality of motors R with a single motor M and a single motor T and supply mechanical power from the motors R only so that the motors M and T merely supply electrical power to the motors R without supplying any mechanical power to the unit.

If the particular unit in question has a normal speed so that a variable speed motor is necessary only under abnormal conditions or in starting the unit, the motors T and R can be converted to single phase induction motors running at a normal speed so that the motor M may be disconnected from the alternating current and direct current line to eliminate the electrical losses therein. Furthermore, if the motor M is not employed to supply mechanical power directly to the unit, it may be mechanically disconnected from the motor T by the clutch 45 so as to eliminate the friction losses in this motor. The motor M would be employed to bring the motors T and R up to their normal speed by depressing the start button 39 and adjusting the rheostats 14 and 15, and then the induction button 42 would be depressed to convert the motors T and R into single phase induction motors. This would leave the motor M still running but would relieve it of part or all of the mechanical load so as to decrease electrical losses therein. Furthermore, depression of "Induction Only" button 44 would disconnect the motor M from both the alternating current and direct current line so as to completely eliminate electrical losses therein. Motor M could also be mechanically disconnected from the motor T by the clutch 45 so that the motor M could come to a stop. A desirable way of accomplishing this would be to make the clutch 45 a magnetically operated clutch which would disconnect the motor M from the motor T when the relay G is closed. If it were again desired to vary the speed of a set of motors, the depression of the stop button would again start motor M, bring it to its pre-set speed and open relay G so that the clutch 45 would again mechanically connect the motor M to the motor T. The depression of the "Restore" button 43 would then again convert the motors T and R into self-synchronous motors so that varying the speed of the motor M by the rheostats 14 and 15 would vary the speed of the set of motors.

As described in detail above, depression of the stop button 40 at any time will disconnect the motors then operating from the alternating current and direct current lines, and allow the same to coast to a stop. The motors can then be started only by depressing the start button 39 to bring the system to normal running condition. As also described in detail above, depression of the brake button at any time at which any of the motors are rotating will cause the rotating motors to act as brakes to stop the same and will leave the system in the idle condition after release of the brake button.

The motors R and T will run in either direction when connected either as self-synchronous or single phase induction motors. The direction of rotation of the motor M may be reversed by reversing a phase thereof, for example, intercharging conductors 33 and 34 connected to the winding A of this motor. The direction of rotation of the motors of a set may, therefore, be controlled by including a reversing switch or contactor, not shown, for reversing a phase of the motor M.

The system of the present invention is extremely versatile, and may be applied in whole or in part to many different types of machinery in which it is necessary or desirable to be able to vary the speed of the entire apparatus or a part thereof. All of the motors employed are of the non-commutator type and receive their power directly from the alternating current line. The direct current supplied to the motors is merely a control and furnishes none of the electrical power causing rotation of the motors. It forms a very small part of the total power taken by the motors and is analogous to the amount of power required to excite the field of a shunt motor as compared to the power applied to the armature thereof. The direct current power may be obtained from a small motor generator set or by rectification directly from the alternating current line.

While I have disclosed the preferred embodiment of my invention, it is understood that the details thereof may be varied within the scope of the following claims.

I claim:

1. In a system for driving apparatus at variable speeds, a polyphase variable speed alternating current motor, a self-synchronous system including a transmitting motor mechanically connected to said variable speed motor and a receiving motor electrically connected to said transmitting motor, said variable speed motor having at least one winding therein variably energized by direct current power to vary the speed of the motor, and means for varying the direct current energization of said winding to vary the speed of said variable speed motor and said transmitting and receiving motors, said transmitting and receiving motors having an auxiliary winding thereon, the auxiliary windings of the receiving motor and transmitting motor being electrically connected to said one winding of the variable speed motor so as to be energized by direct current and have the energization of said auxiliary windings varied by said means.

2. In a system for driving apparatus at variable speeds, a polyphase variable speed alternating current motor, a self-synchronous system including a transmitting motor mechanically connected to said variable speed motor and a receiving motor electrically connected to said transmitting motor, said variable speed motor having at least one winding therein variably energized by direct current power to vary the speed of the motor, and means for varying the direct current energization of said winding to vary the speed of said variable speed motor and said transmitting and receiving motors, said receiving and transmitting motors each having an auxiliary winding thereon energized with direct current power to increase the torque of the receiving motor both at low speeds and high speeds, the auxiliary windings of said receiving and transmitting motors being energized through said means so as to have their energization varied simultaneously with the energization of the auxiliary winding of said variable speed motor.

3. In a system for driving apparatus, a plurality of variable speed polyphase alternating current induction motors, a self-synchronous transmitting motor mechanically connected to each variable speed motor, at least one receiving motor being electrically connected to each transmitting motor and mechanically connected to a unit of said apparatus, means for applying direct current energization to said variable speed motors to control the speed thereof, and means to individually and simultaneously vary the degree of said direct current energization applied to said variable speed motors in order to individually and simultaneously control the speed of the units of said apparatus.

4. In a system for driving apparatus at variable speeds, a variable speed motor, a source of electrical power connected to said variable speed motor, a self-synchronous system including a transmitting motor mechanically connected to said variable speed motor and a receiving motor electrically connected to said transmitting motor, means for converting the motors of said self-synchronous system into single phase induction motors during operation thereof, and means operatively connected to said first named means for simultaneously disconnecting said variable speed motor from said source of power when the motors of said self-synchronous system have been converted into induction motors.

5. In a system for driving apparatus at variable speeds, a variable speed motor, means to vary the speed of said motor, a self-synchronous system including a transmitting motor mechanically connected to said variable speed motor and a receiving motor electrically connected to said transmitting motor, and means to cause all of said motors to produce braking torque to stop said motors.

6. In a system for driving apparatus at variable speeds, a variable speed motor, a source of electrical power connected to said variable speed motor, a self-synchronous system including a transmitting motor mechanically connected to said variable speed motor and a receiving motor electrically connected to said transmitting motor, means for converting the motors of said self-synchronous system into single phase induction motors during operation thereof, and means to cause all of said motors to produce braking torque under any conditions of said driving system to stop said motors.

7. In a system for driving apparatus at variable speeds, a polyphase variable speed induction motor having relatively rotatable members, a source of alternating current power, a source of direct current power, said motor having a primary winding upon one member thereof connected to said source of alternating current power, a secondary winding upon the other member of said motor, and windings on at least one member of said motor energized from said source of direct current power to control the speed of said motor, a self-synchronous system comprising self-synchronous motors including a transmitting motor and a receiving motor having relatively rotatable members, a primary winding upon one member of each self-synchronous motor connected to said source of alternating current power, secondary windings upon the other members of said self-synchronous motors interconnected to provide for the flow of synchronizing currents between said motors and a third winding on the same member as the primary winding of said self-synchronous motors and energized from said source of direct current power, said transmitting motor being mechanically connected to said variable speed motor, means to disconnect said third winding from said source of direct current power and short circuit the secondary windings of said self-synchronous motors to convert the same to single phase induction motors.

8. In a system for driving apparatus at variable speeds, a polyphase variable speed induction motor having relatively rotatable members, a source of alternating current power, a source of direct current power, said motor having a primary winding upon one member thereof connected to said source of alternating current power, a secondary winding upon the other member of said motor, and windings on at least one member of said motor energized from said source of direct current power to control the speed of said motor, a self-synchronous system comprising self-synchronous motors including a transmitting motor and a receiving motor having relatively rotatable members, a primary winding upon one member of each self-synchronous motor connected to said source of alternating current power, secondary windings upon the other members of said self-synchronous motors interconnected to provide for the flow of synchronizing currents between said motors and a third winding on the same member as the primary winding of said self-synchronous motors and energized from said source of direct current power, said transmitting motor being mechanically connected to said variable speed motor, means to disconnect the primary of said variable speed motor from said source of alternating current power, and means to short circuit the secondary winding of said self-synchronous motors to produce braking torques in all of said motors to stop the same.

9. In a system for driving apparatus at variable speeds, a polyphase variable speed induction motor having relatively rotatable members, a source of alternating current power, a source of direct current power, said motor having a primary winding upon one member thereof connected to said source of alternating current power, a secondary winding upon the other member of said motor, and windings on at least one member of said motor energized from said source of direct current power to control the speed of said motor, a self-synchronous system comprising self-synchronous motors including a transmitting motor and a receiving motor having relatively rotatable members, a primary winding upon one member of each self-synchronous motor connected to said source of alternating current power, secondary windings upon the other members of said self-synchronous motors interconnected to provide for the flow of synchronizing currents between said motors and a third winding on the same member as the primary winding of said self-synchronous motors and energized from said source of direct current power, said transmitting motor being mechanically connected to said variable speed motor, means to disconnect said third winding from said source of direct current power and short circuit the secondary windings of said self-synchronous motors to convert the same to single phase induction motors, means to disconnect the primary of said variable speed motor from said source of alternating current power, and means to short circuit the secondary winding of said self-synchronous motors to produce braking torque in all of said motors to stop the same.

10. In a system for driving apparatus at variable speeds, a variable speed motor, means to vary the speed of said motor, a self-synchronous system comprising self-synchronous motors including a transmitting motor and a receiving motor having relatively rotatable members, a source of alternating current power, said self-synchronous motors having relatively rotatable members with a primary winding upon one of said members connected to said source of alternating current power, and secondary windings upon the other member interconnected to provide for the flow of synchronizing currents between said motors, means to convert said self-synchronous motors into single phase induction motors by short circuiting the secondary windings thereof, said self-synchronous motors having a third winding upon the same member as the primary winding thereof, said third winding being interconnected to provide for the flow of synchronizing currents between said motors, both when operating as self-synchronous motors and as single phase induction motors.

11. In a system for driving apparatus at variable speeds, a variable speed motor, means to vary the speed of said motor, a self-synchronous system comprising self-synchronous motors including a transmitting motor and a receiving motor having relatively rotatable members, a source of alternating current power, said self-synchronous motors having relatively rotatable members with a primary winding upon one of said members connected to said source of alternating current power, and secondary windings upon the other member interconnected to provide for the flow of synchronizing currents between said motors, means to convert said self-synchronous motors into single phase induction motors by short circuiting the secondary windings thereof, said self-synchronous motors having a third winding upon the same member as the primary winding thereof, said third winding being interconnected to provide for the flow of synchronizing currents between said motors, both when operating as self-synchronous motors and as single phase induction motors, a source of direct current power, said third winding being connected to said source of direct current power during operation as self-synchronous motors to further increase the synchronizing torque of said self-synchronous motors.

12. In a system for driving apparatus at variable speeds, a variable speed motor, means to vary the speed of said motor, a self-synchronous system comprising self-synchronous motors including a transmitting motor and a receiving motor having relatively rotatable members, a source of alternating current power, said self-synchronous motors having relatively rotatable members with a primary winding upon one of said members connected to said source of alternating current power, and secondary windings upon the other member interconnected to provide for the flow of synchronizing currents between said motors, means to convert said self-synchronous motors into single phase induction motors by short circuiting the secondary windings thereof, said self-synchronous motors having a third winding upon the same member as the primary winding thereof, said third winding being interconnected to provide for the flow of synchronizing currents between said motors both when operating as self-synchronous motors and as single phase induction motors, a source of direct current power, said third winding being connected to said source of direct current power during operation as self-synchronous motors to further increase the synchronizing torque of said self-synchronous motors and means to connect said third winding to said source of direct current power when the self-synchronous motors are operating as single phase induction motors in order to develop a braking torque therein to bring the same to a stop.

13. In a system for driving apparatus, a source of alternating current power, a plurality of motors having relatively rotatable members, primary windings upon one member of each motor energized from said source to produce an alternating current field in said motors, a short circuited secondary winding upon the other member of each motor so that said motors operate as induction motors, a third winding upon said one member of each motor, the third windings of said motors being connected to each other to provide for the flow of synchronizing currents between said windings, a source of direct current and means for connecting said third winding to said source of direct current to provide a braking torque in said motors to stop the same.

CHARLES P. SWEENY.